Sept. 29, 1970  J. J. CATHEY  3,531,668
INDUCTION MOTOR HAVING COOLING ARRANGEMENT
Filed Feb. 10, 1969  3 Sheets-Sheet 2

INVENTOR
JIMMIE J. CATHEY

BY

ATTORNEYS

United States Patent Office

3,531,668
Patented Sept. 29, 1970

3,531,668
INDUCTION MOTOR HAVING COOLING
ARRANGEMENT
Jimmie J. Cathey, Longview, Tex., assignor to Caterpillar
Tractor Co., Peoria, Ill., a corporation of California
Filed Feb. 10, 1969, Ser. No. 797,736
Int. Cl. H02k 9/00
U.S. Cl. 310—58                                    9 Claims

ABSTRACT OF THE DISCLOSURE

An induction motor suitable for high speed, high efficiency operation having a rotor assembly surrounded by a stator assembly, the stator assembly being spaced apart from a housing for the housing to define an annular cavity for receiving cooling fluid, the axial ends of the cavity being closed by annular members which define orifices for directing cooling fluid from the cavity onto end portions of the stator assembly.

---

The present invention relates to an induction motor suitable for high speed operation. One application for the motor contemplates its use as the drive means in an inertia welder wherein the motor experiences rotational speeds of as high as 36,000 r.p.m. In such applications it is desirable that the motor provide maximum horsepower output per unit weight and volume while being capable of operation at the high rotational speeds referred to above.

It is further necessary to dissipate large quantities of heat from the motor interior to permit proper functioning of the motor during sustained periods of operation. It is known in the prior art that cooling fluids or oil may be employed internally within the motor for cooling. The use of fluid coolants permits a substantial reduction in the amount of metal employed within the motor and particularly within its housing. For example, cooling fluid may be circulated throughout the motor housing to contact both the rotor and stator assemblies. A motor of this type, however, is undesirable at least for high speed operation since the fluid circulating throughout the motor housing tends to interfere with high speed rotation of the rotor assembly. Another prior art design which tends to avoid this particular problem has sleeves extending from the ends of the stator assembly to isolate a portion of the housing interior adjacent the stator assembly. Cooling fluid is then circulated through that portion of the housing adjacent the stator assembly with the fluid being prevented from interfering with rotation of the rotor assembly. This design is relatively complex, however, and still does not permit size reduction of the motor to the degree contemplated by the present invention.

Accordingly, it is an object of the present invention to provide a compact induction motor suitable for high speed, high efficiency operation.

It is a further object to permit substantial size reduction of the motor by the provision of means for circulating cooling fluid through the motor.

It is a still further object of the invention to achieve increased cooling within the motor relative to the amount of circulating fluid and to substantially prevent the circulating fluid from interfering with high speed rotation of its rotor assembly.

It is another object of the invention to mount the rotor assembly upon bearings within the motor housing and to employ a common fluid for cooling the motor and lubricating the bearings.

Other objects and advantages of the invention are made apparent in the following description having reference to the accompanying drawings.

Figure 1:
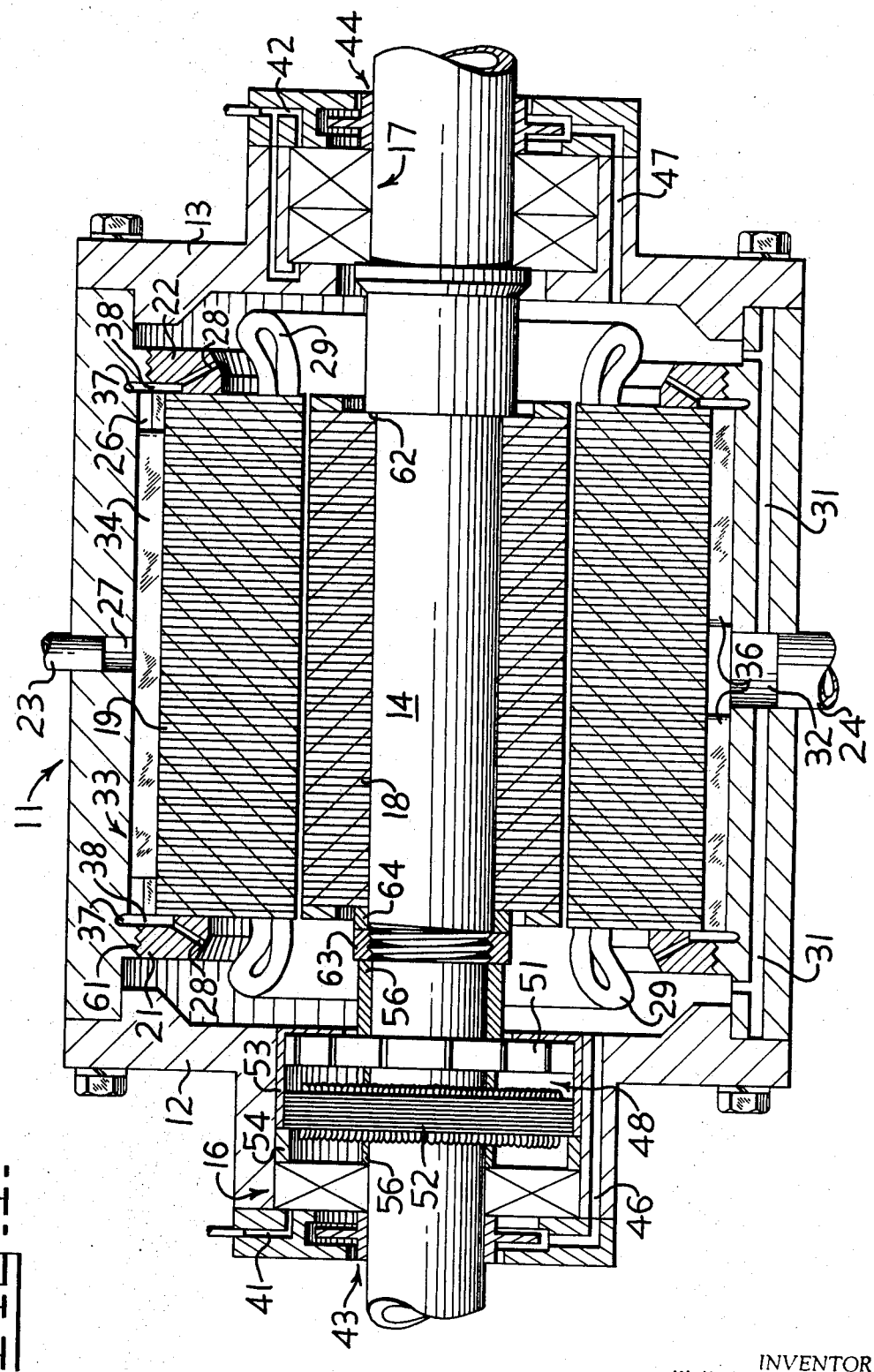
Figure 2:
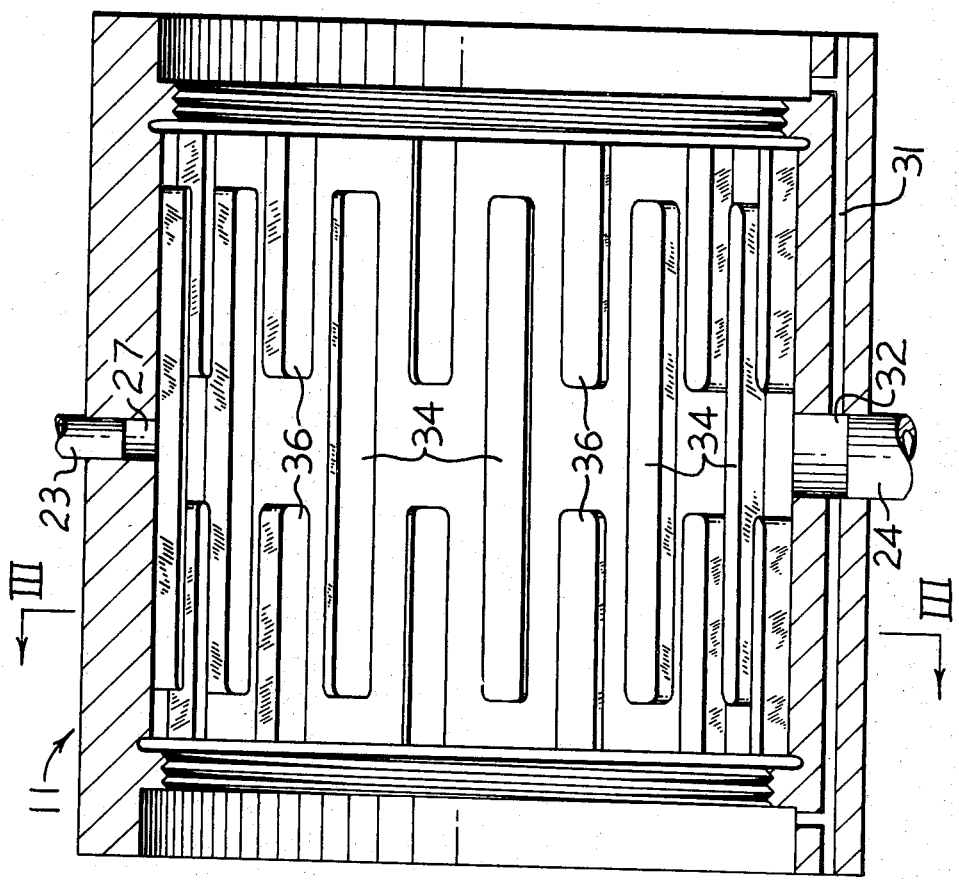
Figure 3:
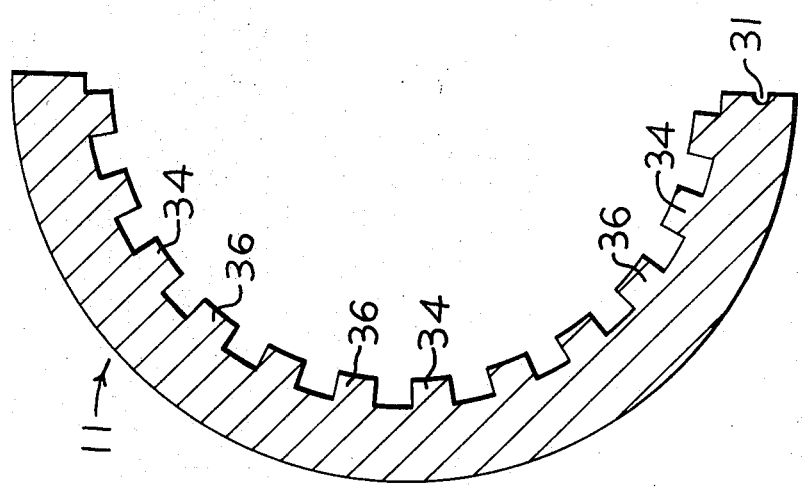
Figure 4:
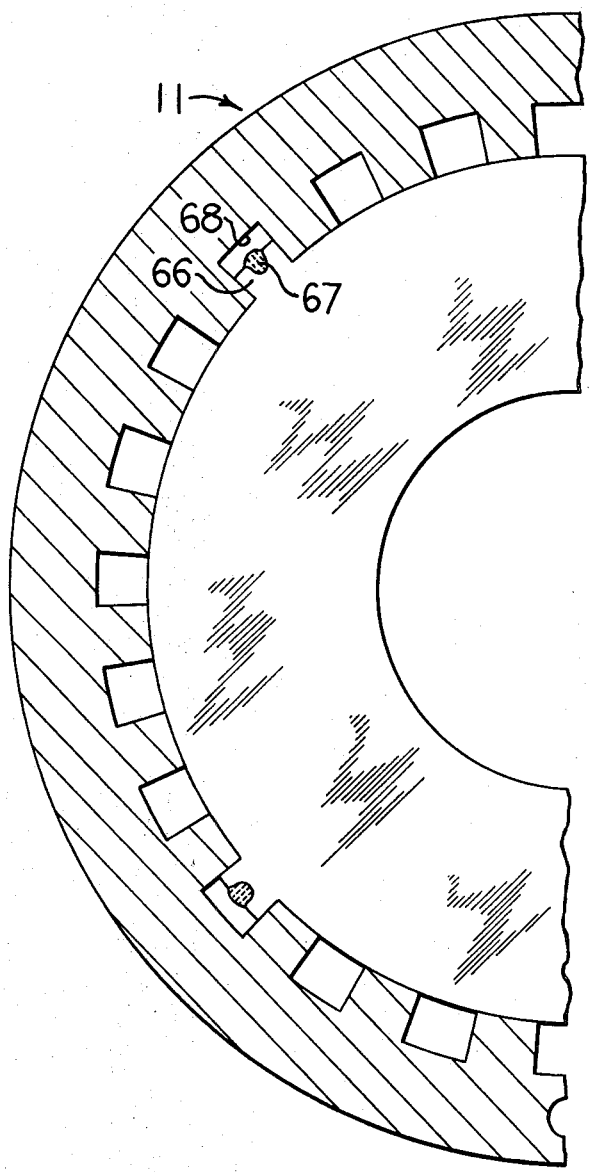

In the drawings:
FIG. 1 is a side view, with parts in section, of the induction motor assembly;
FIG. 2 is a sectional side view of the motor housing;
FIG. 3 is a view taken along section line III—III of FIG. 2; and
FIG. 4 is a partial end view, with parts in section, of the motor housing and stator assembly to illustrate additional structural features of the motor assembly.

The induction motor illustrated in FIG. 1 comprises a tubular housing 11 including end plates 12 and 13. A rotor shaft 14 is axially supported for rotation within the hollow interior of the housing 11 upon bearings 16 and 17 which are disposed in the ends of the housing. The motor also includes a rotor assembly 18 mounted for rotation with the shaft 14 and a stator assembly 19 which encircles the rotor assembly 18 and is secured within the housing 11 by annular retaining members 21 and 22.

The motor is designed for fluid cooled operation with fluid entering the housing 11 through an inlet 23 and exiting the motor through an outlet conduit 24. The cooling arrangement for circulating the cooling fluid through the motor is designed to permit substantially increased cooling within the motor relative to the rate of fluid being circulated. Accordingly, the amount of metal within the motor is substantially reduced permitting an unusually high power density per unit weight and volume. The cooling arrangement is also designed so that cooling fluid being circulated through the motor has a minimum effect upon the rotor assembly which may operate at high speeds of as much as 36,000 r.p.m.

The cooling arrangement referred to above is formed within the motor assembly of FIG. 1 by the housing 11, the stator assembly 19, and the retaining members 21 and 22. The stator assembly 19 is spaced apart from the housing 11 to form an annular cavity 26 which is communicated with the inlet conduit 23 by a port 27 formed in the housing 11. The retaining members 21 and 22 generally close the axial ends of the cavity 26 as well as securing the stator assembly 19 in place. The retaining members 21 and 22 are formed with a plurality of angled orifices such as those indicated at 28. Cooling fluids from the inlet conduit 23 circulates throughout the cavity 26 to cool the outer periphery of the stator assembly 19. The fluid then passes through the orifices 28 which are positioned to direct the fluid onto end portions of the stator assembly.

In greater particularity, the stator assembly 19 is of a conventional type including a stator winding with the end turns of the stator winding being indicated at 29. The orifices 28 are preferably angled to jet the cooling fluid directly onto the end turns 29 which are a major source of the heat generated by the motors. Jetting of the cooling fluid onto the end turns 29 of the winding, permits more rapid cooling as compared, for example, to complete immersion of the outer periphery and end surfaces of the stator assembly 19 in cooling fluid.

The use of fluid jets for cooling end portions of the stator assembly 19 also tends to avoid interference by the fluid with the rotor assembly 18 during high speed operation. Cooling fluid collects in the end portions of the housing 11 and is returned to the outlet conduit 24 by cross-drilled passages 31 formed in the housing 11 and an outlet port 32 which is in communication with the conduit 24.

Labyrinth means 33 are arranged within the cavity 26 to regulate fluid flow through the cavity and to insure a continuous supply of cooling fluid to each of the orifices 28. In the present embodiment, the labyrinth means comprises a plurality of elements which preferably are axially arranged in circumferentialy spaced relation throughout the cavity. Alternate elements are formed of one piece and two piece construction with a one piece element or rib being indicated at 34 and a two piece element or rib being indicated at 36. In this manner, the labyrinth insures circulation of the cooling fluid throughout the entire cavity. A constant supply of fluid is provided to each of the orifices 28 with excess fluid from the cavity being exhausted from the cavity through the outlet port 32. The retaining members 21 and 22 are preferably L-shaped. The housing 11 has adjacent annular slots 37 so that the housing and retaining members 21 and 22 form annular reservoirs 38 wherein fluid collects from the cavity and passes to the orifices 28.

The labyrinth elements or ribs 34 and 36 may be formed either on the housing 11, the stator assembly 19 or independently for insertion in the cavity 26. To simplify the motor construction, the labyrinth ribs are preferably formed as a part of the motor housing 11. This construction is best seen in FIGS. 2 and 3. The labyrinth ribs may then be cast or otherwise formed as an integral part of the motor housing and then machined or otherwise made to conform closely to the outside dimension of the stator assembly 19.

Additional components of the motor assembly are arranged to simplify its construction and operation. For example, the bearings 16 and 17 are designed for operation under forced lubrication. Lubricant is delivered to the bearings 16 and 17 through inlet ports 41 and 42 respectively which are formed in the ends of the motor housing. The lubricating fluid is prevented from escaping between the housing and the shaft 14 by seals indicated at 43 and 44. The fluid is then exhausted from the bearings through outlet ports 46 and 47 which are formed in the motor housing and are in communication with the interior end portions of the motor housing. Common fluid may thus be employed both for cooling the motor and for lubricating the bearings. This permits a single pump and fluid cooler (not shown) to provide both for cooling the motor and lubricating the bearings.

The motor is also provided with a sensing device 48 for detecting the direction and speed of the rotor assembly 18 and shaft 14. The sensing device 48 is arranged within an end of the housing to contribute to compactness of the motor design. The sensing device 48 is of a generally conventional design including a rotary transformer 51 and a brushless synchro unit 52 surrounding the shaft 14 adjacent the bearing 16. Since the device 48 is to provide a control signal for apparatus (not shown) which establishes a source frequency for the motor assembly, it is desirable to shield it from stray electrical fields and also to enhance its magnetic characteristics to obtain a high fidelity speed and direction signal. To accomplish this, a non-magnetic L-shaped shielding sleeve 53 is arranged about the components 51 and 52 together with a non-magnetic spacer 54 to shield the sensing device from the motor housing and from the rotor and stator assembly. A non-magnetic sleeve 56 is also mounted on the shaft 14 for additional shielding of the sensing device.

To permit connection of the motor in driving relation at either or both ends of the motor assembly, the shaft 14 penetrates both ends of the motor housing. One of the bearings, for example, that indicated at 17, is a thrust bearing to maintain axial alignment of the shaft 14 and rotor assembly 18 relative to the stator assembly 19.

The components of the present motor assembly are further designed to facilitate its assembly and maintenance. For example, the stator assembly 19 is secured within the housing by the retaining members 21 and 22 which threadedly engage the housing as at 61. The rotor shaft 14 has a stepped surface 62 which secures one end of the rotor assembly 18. A collar 63 threadedly engages the shaft 14 and acts against a spacer member 64 at the opposite end of the rotor assembly from the shoulder 62 to secure the rotor assembly in place adjacent the stator asembly 19. Accordingly, both the stator and rotor assemblies may be readily removed from the housing.

The present motor assembly also includes means for facilitating construction of the stator assembly and for securing the stator assembly against rotation within the housing 11. As best seen in FIG. 1, the stator assembly 19 is conventionally formed from a large number of laminations. Referring now to FIG. 4 as well, the laminations are secured together to form the stator assembly, for example, by means of an axially extending weld bead deposited in semicircular grooves at the ends of the tabs such as is indicated at 67. The axial key formed by the tabs 66 is disposed in an axial slot 68 formed within the housing 11. Within the preferred motor housing design set forth above, the slot 68 is formed by an adjacent pair of the ribs 34 and 36. The tabs 66 extend only partially into the slot 68 so that they do not interfere with the circulation of cooling fluids through the motor. One axial key formed by the tabs 66 would be sufficient to key the stator assembly within the motor housing. However, additional tabs are desirable to properly maintain the individual laminations within the stator assembly and to minimize buckling of the laminations due to welding stresses.

What is claimed is:

1. In an induction motor suitable for high speed, high efficiency operation, the combination comprising
   a tubular housing,
   a rotor shaft axially supported for rotation in the housing by bearings toward the axial ends of the housing, the housing defining inlets for communicating fluid to the bearings, the housing also defining outlets for communicating fluid from the bearings into the housing,
   a rotor assembly supported on the shaft,
   a stator assembly arranged in the housing about the rotor assembly, the stator assembly and housing defining an annular cavity therebetween, the stator assembly comprising a stator winding having end turns extending from the axial ends of the stator assembly,
   means forming a fluid inlet in communication with the cavity,
   annular members disposed in closing relation at the axial ends of the cavity between the stator assembly and housing, the annular members defining a plurality of orifices each arranged in facing relation with an adjacent portion of the stator winding end turns so that fluid is jetted from the orifices directly toward the end turns of the stator winding, and
   drain means formed in the housing to receive the fluid, the drain means being in communication with the housing interior at the axial ends of the stator assembly whereby fluid is free to circulate within the housing while principally passing from the orifices onto the stator winding end turns and then into the drain means to facilitate high speed operation of the motor.

2. The invention of claim 1 further comprising labyrinth means arranged in the cavity to regulate fluid flow therethrough.

3. The invention of claim 2 wherein the labyrinth means comprises a plurality of ribs formed on an interior surface of the housing.

4. The invention of claim 2 wherein the drain means comprises an outlet conduit generally in diametric opposition in the housing relative to the fluid inlet and in communication with the annular cavity, the labyrinth means being effective to maintain uniform fluid flow through the cavity with excess fluid being received by the outlet, and drain passages communicating the axial ends of the housing with outlet conduit.

5. The invention of claim 1 wherein the annular members are secured in threaded relation to the housing and have surfaces adjacent the stator assembly to secure the stator assembly within the housing.

6. The invention of claim 5 wherein the annular members cooperate with the housing to form annular manifolds at the axial ends of the cavity and in communication with the orifices.

7. The invention of claim 5 wherein the ribs are axially arranged in circumferentially spaced apart relation to form an axially arranged slot between each pair of ribs and the stator assembly comprises a plurality of laminations each having at least one tab forming an axially arranged key on the stator assembly which is received by one of the slots in the housing.

8. In a high speed, high efficiency induction motor, the combination comprising,
a housing having a hollow interior,
a rotor shaft centrally supported for rotation in the housing by bearings toward the axial ends of the housing, at least one of the bearings being a thrust bearing, the housing defining inlets for communicating fluid to the bearings, the housing also defining outlets for communicating fluid away from the bearings,
a rotor assembly supported on the shaft,
a stator assembly arranged in the housing about the rotor assembly, the stator assembly and housing defining an annular region therebetween,
a plurality of axially arranged ribs being formed on an interior surface of the housing to form a labyrinth in the annular region between the housing and stator assembly, the stator assemby comprising a plurality of laminations each having at least one tab to form an axially arranged key on the stator assembly which is received by a slot formed by an adjacent pair of the ribs,
a fluid inlet formed by the housing in communication with the annular region,
means defined by the housing and stator assembly at the axial ends of the annular region, the means being arranged so that fluid exits the annular region toward winding end turns of the stator assembly, and
drain means formed in the housing to receive the fluid, the drain means being in communication with the housing interior at the axial ends of the stator assembly whereby fluid exiting the annular region toward the stator winding end turns is then free to circulate within the housing while principally passing into the drain means to facilitate high speed operation of the motor.

9. The invention of claim 8 further comprising electrical speed and direction sensing means arranged inside one end of the motor housing and a non-magnetic member disposed adjacent the sensing means as shielding.

References Cited

UNITED STATES PATENTS

| | | | |
|---|---|---|---|
| 2,357,923 | 9/1944 | Anderson | 310—60 |
| 2,615,069 | 10/1952 | Gallagher. | |
| 3,060,335 | 10/1962 | Greenwald | 310—58 |
| 3,388,559 | 6/1968 | Johnson | 310—54 |
| 3,430,085 | 2/1969 | Mains | 310—54 |
| 3,445,695 | 5/1969 | Schultz | 310—58 |
| 3,445,697 | 5/1969 | Costa | 324—70 |

MILTON O. HIRSHFIELD, Primary Examiner

R. SKUDY, Assistant Examiner

U.S. Cl. X.R.

310—80, 166